Nov. 17, 1925.

L. F. WHELCHEL 1,562,397

TRAP

Filed April 6, 1925  2 Sheets-Sheet 1

L. F. Whelchel
INVENTOR

BY Victor J. Evans
ATTORNEY

WITNESS:

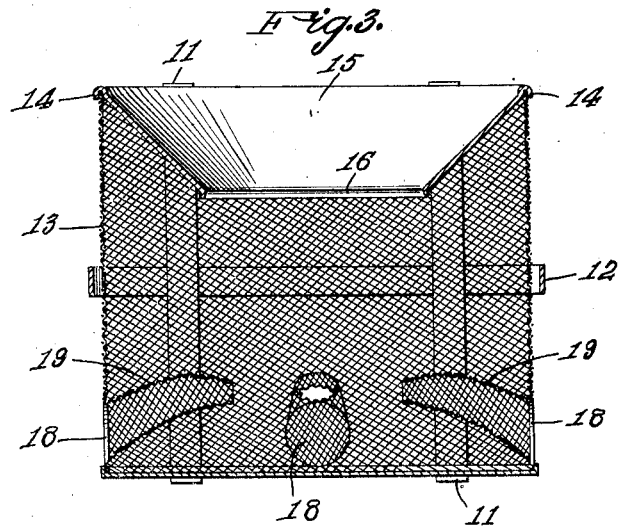
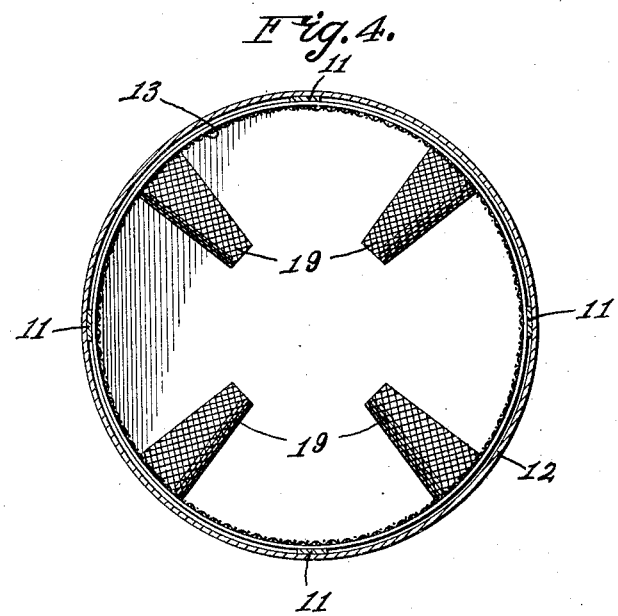

Patented Nov. 17, 1925.

1,562,397

UNITED STATES PATENT OFFICE.

LYMAN F. WHELCHEL, OF ANNISTON, ALABAMA, ASSSIGNOR OF ONE-HALF TO W. F. BRITTON, OF ANNISTON, ALABAMA.

TRAP.

Application filed April 6, 1925. Serial No. 21,132.

*To all whom it may concern:*

Be it known that I, LYMAN F. WHELCHEL, a citizen of the United States, residing at Anniston, in the county of Calhoun and State of Alabama, have invented new and useful Improvements in Traps, of which the following is a specification.

This invention relates to improvements in traps especially for catching roaches and other insects.

Another object of the invention is the provision of an insect trap which is simple, light and durable and which is constructed so that it may be easily flushed out and kept in proper condition for use.

Another object of the invention is the provision of an insect trap of novel construction, which includes a protecting frame enclosing a wall and connected to the bottom of the trap, and a bail connected to the frame, whereby the trap may be conveniently handled with the weight of the trap supported by its bottom.

With the above and other objects in view, the invention further includes the following novel features and details of construction, to be hereinafter more fully described, illustrated in the accompanying drawings and pointed out in the appended claim.

In the drawings:—

Figure 3 is a vertical central sectional view.

Figure 4 is a horizontal sectional view.

Figure 1:
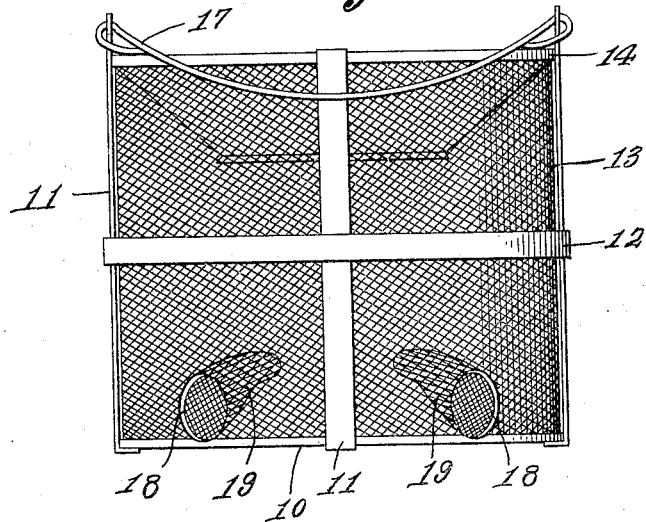
Figure 1 is an elevation of a trap constructed in accordance with the invention.
Figure 2:
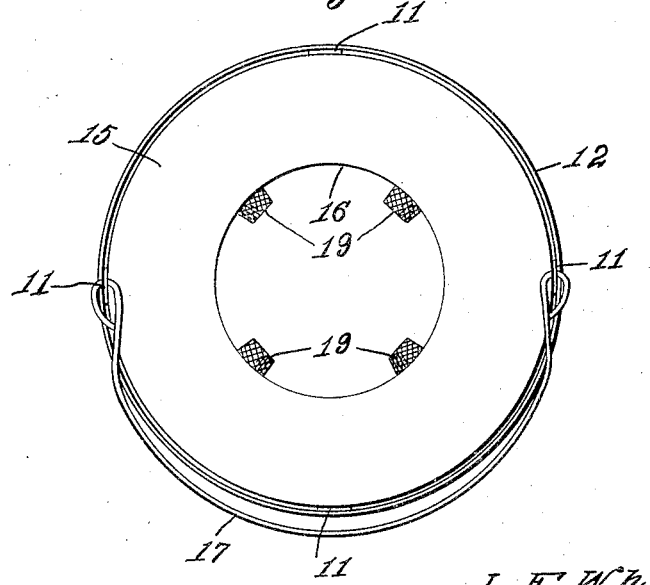
Figure 2 is a top plan view of the same.

Referring in detail to the drawings, wherein like characters of reference denote corresponding parts, the trap is shown as comprising an imperforate bottom 10, which may be of any suitable shape, the bottom shown being round. Secured to and rising from the bottom 10 are spaced standards 11 while secured to and surrounding these standards at a point substantially central of their lengths is an annulus 12, the said standards and annulus providing a protecting frame which encloses a foraminous wall 13. The lower edge of this wall is secured to the bottom 10, while its upper edge extends beneath the outwardly and downwardly turned flange 14 of a top 15. The upper ends of the standards 11 are secured to this top, so that the wall 13, which is preferably formed of woven wire has its opposite edges protected and is also enclosed in a protecting frame, as above stated.

The top 15 inclines inwardly and downwardly within the trap and is provided with a relatively large concentrically arranged opening 16. The upper ends of two of the standards 11 extend above the top 15 and provide lugs, a bail 17 having its opposite ends secured through openings provided in these lugs. By this means when the trap is handled its weight is supported by the bottom 10 and all strain is relieved from the wall 13.

This wall is provided near its bottom with diametrically arranged spaced openings 18, which are surrounded by the large ends of inwardly extending, tapered, substantially cylindrical sleeves 19 which provide entrance passages into the trap. The sleeves 19 are preferably curved as shown and extend upwardly so that their inner restricted ends are spaced an appreciable distance from the bottom of the trap and roaches or other insects entering the trap through these sleeves will be prevented from again reaching the inner ends of the sleeves.

Any suitable material may be placed within the trap to attract the insects and when desired, the trap may be readily cleaned by flushing the same either with running water, or immersing the trap in water and rotating and agitating the same through the medium of the bail 17.

The invention is susceptible of various changes in its form, proportions and minor details of construction and the right is herein reserved to make such changes as properly fall within the scope of the appended claim.

Having described the invention what is claimed is:—

An insect trap comprising a bottom, a frame secured to the bottom and including spaced vertically extending standards, an annulus connecting the standards, a foraminous wall having one edge secured to the bottom within the frame and provided with spaced openings, a downwardly inclined top secured to and extending inwardly from the frame and the opposite ends of the foraminous wall and provided with a central opening and inwardly tapering passages extending within the trap from the spaced openings of the wall.

In testimony whereof I affix my signature.

LYMAN F. WHELCHEL.